3,116,971
METHOD FOR THE CONCURRENT PRODUCTION OF ALKALI METAL ALUMINATE AND HYDROGEN FLUORIDE

Kizhakke G. Hrishikesan, Little Rock, and Fredrick Earl Adkins, Jr., Benton, Ark., assignors to Reynolds Metals Company, Richmond, Va., a corporation of Delaware
No Drawing. Filed Feb. 7, 1961, Ser. No. 87,541
10 Claims. (Cl. 23—52)

This invention relates to the treatment of aluminous ores especially those having a high silica content, to produce alkali metal aluminate. More particularly, the invention concerns a novel process for the concurrent production of sodium aluminate and hydrogen fluoride by the hydrothermal treatment of fluorspar in the presence of alumina, silica, and soda ash.

Sodium aluminate constitutes an important intermediate product in the transformation of aluminum ores, such as bauxite, into alumina, the feed material for the reduction cells. The basic Bayer process comprises digesting the bauxite with caustic soda solution to form a supersaturated solution of sodium aluminate from which relatively pure aluminum hydroxide is precipitated, and then converting to alumina by heating in rotary kilns at about 1800° F. to drive off combined water.

Hydrogen fluoride is employed in aluminum production for converting alumina to aluminum fluoride or to cryolite, both used as fluxes for the alumina in the reducing pots. The hydrogen fluoride is conventionally made by reacting fluorspar (calcium fluoride) with sulfuric acid.

It has been the view of the industry that the presence of substantial amounts of silica in both bauxite and fluorspar is detrimental in that the silica consumes caustic soda used in converting bauxite to sodium aluminate, and contaminates the hydrogen fluoride when the fluorspar is reacted with sulfuric acid.

Accordingly, it is the prevailing practice in the industry to employ as raw materials mainly low silica content bauxites and fluorspars. Inasmuch as domestic supplies of low silica bauxite are limited, it has been necessary to place primary reliance upon foreign supplies of bauxite, principally form Jamaica, Haiti and the Guianas for production of aluminum in the United States. Similarly, reliance for supplies of fluorspar of low silica content, the so-called acid grade, has also had to be placed upon imported materials, principally from Mexico.

There are available within the United States ample supplies of bauxite high in silica content, and of high silica fluorspar, of metallurgical grade. Prior to the present invention, no technologically and economically satisfactory method of employing high silica bauxite and high silica fluorspar has been available to aluminum producers.

Even where domestic high silica bauxites have been utilized, each pound of silica present normally gives rise to a loss of 1.2 pounds of alumina and the same amount of soda, in the processing of the bauxite, forming an insoluble compound which remains in the waste mud remaining as a residue in the Bayer caustic soda extraction. Losses of this magnitude are not economically feasible, so that a costly sintering treatment of the muds is required in all plants using domestic bauxites. In this sintering process the compound of alumina and silica is reacted with limestone and soda ash to form dicalcium silicate and sodium aluminate in accordance with the equation:

$$Al_2O_3 + Na_2CO_3 + SiO_2 + 2CaCO_3$$
$$= 2NaAlO_2 + 3CO_2 + 2CaO \cdot SiO_2 \quad (1)$$

The dicalcium silicate is substantially insoluble and the sodium aluminate quite soluble in the caustic liquors used to extract the sinter. Thus, the alumina and soda are recovered as sodium aluminate and the insoluble calcium silicate is discarded. However this extra treatment constitutes such an economic burden on the use of domestic bauxites that new plants are designed to process only low silica bauxites to avoid the heavy capital investment and extra processing costs incident to the mud sintering step.

The presence of high silica content in fluorspar is the source of additional difficulty, since in the reaction of fluorspar with strong sulfuric acid or oleum, any silica present is converted to volatile silicon tetrafluoride, which condenses with and contaminates the hydrogen fluoride produced. Furthermore, the stills used for production of hydrogen fluoride are thereby corroded badly, adding to maintenance costs. Expenses also include the cost of sulfuric acid itself. Furthermore, the vapors of sulfuric acid (as well as silica and dust) contaminate the product, and there is also involved the disposal of by-product calcium sulfate as a waste material of little or no value.

In accordance with this invention, there is provided a novel process for the direct and concurrent production of sodium aluminate and hydrogen fluoride from raw materials such as aluminous ores and minerals high in silica and from calcium fluoride containing materials likewise high in silica, by hydrothermal treatment at elevated temperatures. In this novel process the presence of silica is not only not detrimental, but silica is necessary as one of the reacting materials. Thus, the process of the present invention makes possible for the first time the economical utilization of low grade, high silica bauxite and other aluminous ores and minerals, and low grade, high silica fluorspar and other calcium fluoride sources, in the production of aluminum.

The novel process of this invention involves the sintering reaction of an alkaline earth metal fluoride, silica, alumina, and a source of an alkali metal monoxide, all in the solid phase, with water in the vapor phase (steam), in accordance with the following general equation:

2 alkaline earth metal fluoride + $SiO_2$ + $Al_2O_3$ + alkali metal monoxide + $2H_2O$ = 2 alkaline earth metal oxide.$SiO_2$ + 2 alkali metal aluminate + 4HF  (2)

There may be employed as a source of hydrogen fluoride any alkaline earth metal fluoride, including calcium fluoride, strontium fluoride, and barium fluoride, either singly or in admixture. Calcium fluoride is the preferred alkaline earth fluoride, and it may be used from any natural source, such as the mineral fluorspar, or as synthetically made calcium fluoride. The process of this invention may also utilize waste calcium fluoride-containing materials obtained in the defluorination of phosphate, presently a by-product of the phosphate fertilizer industry.

The source of an alkali metal monoxide may be, for example, the carbonate or the hydroxide of an alkali metal, such as sodium or potassium carbonates or hydroxides, or the carbonates or hydroxides of other alkali metals including lithium, caesium and rubidium. For commercial purposes it is advantageous to employ a compound yielding sodium monoxide, such as soda ash (sodium carbonate), caustic soda, or the alkali content of Bayer process red mud waste.

The novel process of this invention will be illustrated by the sintering reaction of calcium fluoride, silica, alumina, and soda, all in the solid phase, with water in the vapor phase (steam), in accordance with the following equation:

$$2CaF_2 + SiO_2 + Al_2O_3 + Na_2CO_3 + 2HO$$
$$= 2CaO \cdot SiO_2 + 2NaAlO_2 + 4HF + CO_2 \quad (3)$$

Thus, the new process produces a conversion of the silica present to dicalcium silicate by employing the calcium fluoride as a source of calcium, thereby accomplishing the same result as the desilication reaction of Equation 1 above, but eliminating limestone as an added raw material for supplying calcium. The presence of large amounts of silica in the fluorspar is now an advantage since it helps to dispose of the calcium. Thus the cheaper high silica fluorspars and similar raw materials can be readily employed in the process.

Not only high silica bauxites, such as domestic bauxites, can be employed as a source of alumina to form the sodium aluminate, which is one of the primary aims of the process, but other highly siliceous ores and minerals containing alumina may be employed, including for example, aluminum silicate minerals such as aluminous clays, kaolin, sillimanite, kyanite and slags to supply not only their alumina, but also the now necessary silica. In addition, the process permits the use of red mud from domestic bauxite processing plants, if desired, as a substitute for part or all of the alumina, soda and silica required by the method of the invention.

The calcium fluoride also serves as the source of the hydrogen fluoride which is produced concurrently with the sodium aluminate in the process of the invention, by hydrothermal reaction with water vapor which is normally present in the combustion gases used for sintering sodium aluminate.

The use of higher silica bauxites results in increased production of hydrogen fluoride, because the amount of alumina, soda and silica in the mud increases and requires more fluorspar to take care of the increased amount of silica. Thus, the process is readily adaptable to accommodate variations in demand for hydrogen fluoride or sodium aluminate.

The present invention further has the advantage of providing for the production of low silica hydrogen fluoride gas without the use of sulfuric acid. It eliminates heavy maintenance and product contamination incident to use of fluorspar-sulfuric acid stills.

The process can utilize existing sintering and extraction equipment in present domestic bauxite processing plants, including the essential treatment of red muds containing alumina, soda, and silica. Additional silica may be included in the form of sand or quartz, as necessary.

In carrying out the process of the invention, the calcium fluoride, silica, alumina, and soda, as furnished in any of the aforementioned forms, are intimately mixed in either the dry or wet state, in substantially stoichiometric proportions, in accordance with the requirements of Equation 3.

The dry or wet mixture is sintered in a suitable apparatus, such as a direct fired kiln, for a period between about 15 and about 120 minutes, at a temperature above about 1000° C., and preferably between about 1000° C. and 1300° C. in the presence of water vapor or steam. The steam may be supplied as such or in the form of combustion gases. The quantity of steam supplied should be at least sufficient to maintain the molar ratio expressed in Equation 3, and to accomplish the hydrothermal decomposition of the calcium fluoride to form hydrogen fluoride. Particular combinations of time and temperature will depend upon the nature of the components of the mixture, intimacy of contact between steam and solid reactants, and the moisture content of the gases.

There is produced as the result of the sintering operation a granular sinter readily removable from the hot end of the kiln and composed predominantly of sodium aluminate and dicalcium silicate. Hydrogen fluoride gas, substantially silica-free, is drawn from the cold end of the kiln, together with combustion products of the fuel used.

The sintering can also be carried out in a fluid bed type of reactor or in a hot-wall evaporator, which possess the advantages of utilizing smaller particles, and hence providing better contact between steam and solid materials than the usually larger pellets formed in a rotary kiln. Moreover, the hot-wall evaporator has the additional advantage of providing an atmosphere preponderantly of steam, serving to accelerate the reaction. Any conventional heating fuel may be employed, such as coal, oil, and natural gas.

The combustion gases from the cold end of the kiln, which contain hydrogen fluoride, are processed for recovery of the HF content, either by direct passage through columns of activated alumina to produce aluminum fluoride, or by reacting the hydrogen fluoride with sodium aluminate solution to precipitate cryolite, in accordance with conventional procedures. The hydrogen fluoride not needed for aluminum production can be absorbed in water to form hydrofluoric acid.

The granular sinter may be cooled, ground and leached with water or with dilute sodium hydroxide solution in the conventional manner to produce sodium aluminate solution for the manufacture of alumina hydrate, or for reaction with the evolved hydrogen fluoride gas to form cryolite. In addition the sodium aluminate sinter can be cooled, ground, and sold as crude sodium aluminate for use in water treatment, paper sizing, and many other uses.

The following examples illustrate the novel process of this invention, but they are not to be regarded as limiting.

EXAMPLE 1

*Hydrothermal Decomposition of $CaF_2$ in Presence of Bauxite*

Fluorspar was used which analyzed 97.62% $CaF_2$, 0.92% $SiO_2$ and 1.29% $CaCO_3$. Bauxite was used which analyzed 9.86% $SiO_2$, 56.46% $Al_2O_3$, 0.96% $Fe_2O_3$, 2.65% $TiO_2$ and 28.48% loss on ignition.

A batch was made by mixing together 200 parts by weight of fluorspar, 745 parts by weight of bauxite and 424 parts by weight of $Na_2CO_3$, all of which were previously ground through 100 mesh. The mixture was then placed as a thin layer in a platinum crucible and heated in an electric muffle furnace maintained at a temperature of 1200° C. Steam was introduced into the furnace to ensure the presence of adequate water vapor to maintain the reaction. The heating was continued for 90 minutes, after which the crucible was cooled and weighed. 880.42 parts of sinter were obtained. The sinter was granular and had not fused or stuck to the crucible. It was then ground and leached with 10,063 parts of 0.785% NaOH solution, at 160° F. for 30 minutes. The slurry was filtered and the residue was washed with hot water. Thus, 28,610 parts of sodium aluminate were obtained, which analyzed 1.27% $Al_2O_3$, 0.86% $Na_2O$, no fluorine and a bare trace of silica.

The dried residue from the extraction (332 parts) was analyzed and showed 43.0% CaO, 17.7% $Al_2O_3$, 0.8% F and 22.6% $SiO_2$. The results of the treatment may be summarized as follows:

HF evolved 97 parts: Recovery of 97% of total fluorine charge.
Alumina extracted 362 parts: Recovery of 86% of total alumina charge.
$SiO_2$ accounted for 74 parts: Recovery of 99% of $SiO_2$, the ratio of F:$SiO_2$ was 100:1 HF gas produced.
$Na_2O$ extracted 243 parts: Recovery 99% of total $Na_2O$ charged.

EXAMPLE 2

*Hydrothermal Decomposition of $CaFe_2$ in Presence of Red Mud From Bayer Process*

7.48 g. of a mix containing 2.00 g. fluorspar (97.62% $CaF_2$, 0.92%, $SiO_2$, 1.29% $CaCO_3$), 4.70 g. red mud (Arkansas) (21.67% $SiO_2$, 9.33% CaO, 25.89% $Al_2O_3$, 6.97% $Fe_2O_3$, 2.28% $TiO_2$, 14.65% $Na_2O$, and 14.22% L.O.I.), 0.70 g. C.P. $CaCO_3$, and 0.08 g. C.P. $Na_2CO_3$ [mix analysis: $SiO_2$—13.8%, $Al_2O_3$—16.2%, $Na_2O$—9.8% ($CaF_2$—26.1%), CaO—30.1% expressing all Ca as CaO] were placed in a 100 ml. platinum water analysis dish and treated with steam while heating at a temperature of 1016° C. The residue was capable of being easily handled. It was ground and extracted with 0.2% NaOH solution for 30 minutes at 160° F. Analysis of the residue indicated that 97.8% of the fluorine had been evolved and that 67.2% of the alumina had been extracted.

EXAMPLE 3

9.77 g. of a mix consisting of 2.04 g. fluorspar (analyzing 95.42% $CaF_2$, 2.58% $CaCO_3$, and 0.43% $SiO_2$), 4.65 g. Arkansas bauxite (analyzing 16.44% $SiO_2$, 46.8% $Al_2O_3$, 8.14% $Fe_2O_3$, and 1.9% $TiO_2$), and 3.08 g. $K_2CO_3$ (95.5% pure) were placed on a platinum crucible lid and inserted into a combustion tube at 1200° C. The reaction was allowed to continue for 90 minutes while steam was passing through the tube at rate of 5.5 g./minute.

The residue weight at the end of the test was 6.2 g. This was ground and extracted with 39.2 g. 5.55% KOH solution at 160° F. for 30 minutes after which it was filtered and washed with 81.3 g. water. 4.2 g. dried residue remained.

Extract residue analysis:
  CaO (percent) _____ 32.35
  $Al_2O_3$ (percent) _____ 29.57
  F (percent) _____ 1.78
  $SiO_2$ (percent) _____ 16.08
  $K_2O$ (percent) _____ 5.15
  $Fe_2O_3$ (percent) _____ 8.18

Filtrate-wash analysis:
  Wt. (g.) _____ 116.1
  $Al_2O_3$ (percent) _____ 0.78
  $K_2O$ (percent) _____ 2.42
  F (percent) _____ 0.01

Results:
  90.1% of F was evolved.
  41% of $Al_2O_3$ was extracted.
  6.7% $SiO_2$ was lost in test or unaccounted for.

EXAMPLE 4

*Hydrothermal Decomposition of $BaF_2$ in Presence of Bauxite*

13.2 g. of a mix consisting of 4.68 g. Arkansas bauxite (analyzing 16.44% $SiO_2$, 46.8% $Al_2O_3$, 8.14% $Fe_2O_3$, and 1.9% $TiO_2$), 2.28 g. C.P. $Na_2CO_3$, and 4.55 g. 99% $BaF_2$ were placed on a platinum crucible lid and inserted into a combustion tube at 1200° C. The reaction was allowed to continue for 90 minutes while steam was being passed at the rate of 2.2 g. per minute.

The residue weight at the end of the test was 9.4 g. This was ground and extracted with 100 g. 0.8% NaOH solution at 160° F. for 30 minutes after which it was filtered and washed with 108 g. water. 8.0 g. dried residue remained.

Extract residue analysis:
  BaO (percent) _____ 51.25
  $Al_2O_3$ (percent) _____ 21.87
  F (percent) _____ 2.85
  $SiO_2$ (percent) _____ 10.32
  $Na_2O$ (percent _____ 6.71
  $F_2O_3$ (percent) _____ 5.66

Filtrate-wash analysis:
  Wt. (g.) _____ 161.6
  $Al_2O_3$ (percent) _____ 0.38
  $Na_2O$ (percent) _____ 0.66
  F (percent) _____ 0.14
  BaO (percent) _____ 0.15

X-ray diffraction:
  Beta-$BaSi_2O_5$—present.
  $Ba_2SiO_4$—present,
  $BaF_2$—present.
  Unidentified phase(s) present.

Results:
  53.2% of F was evolved.
  25.8% of $Al_2O_3$ was extracted.
  No $SiO_2$ was evolved.

| | Fluorspar | | Aluminous Material | | Siliceous Material, parts | Soda Ash, Quantity, parts | HF Production, parts | $Al_2O_3$ Products, parts |
|---|---|---|---|---|---|---|---|---|
| | Analysis, percent | Quantity, parts | Analysis, percent | Quantity, parts | | | | |
| Example 5: Fluorspar and Kaolin. | $CaF_2$—97.62 $CaCO_3$—1.29 $SiO_2$—0.92 | 200 | $Al_2O_3$—38.52 $SiO_2$—43.71 $Fe_2O_3$—1.55 $TiO_2$—1.82 | 167.5 | None | 65 | 97 | 55.5 |
| Example 6: Fluorspar and red mud from Bayer process. | $CaF_2$—97.62 $CaCO_3$—1.29 $SiO_2$—0.92 | 200 | $Al_2O_3$—26.0 $SiO_2$—20.9 $Fe_2O_3$—8.9 $TiO_2$—3.2 $Na_2O$—15.8 CaO—8.9 | 350 | 17 | None | 97 | 78 |
| Example 7: Refractory Fluorspar and Kaolin. | $CaF_2$—70 $CaCO_3$—15 $SiO_2$—15 | 279 | $Al_2O_3$—38.52 $SiO_2$—43.71 $Fe_2O_3$—1.55 $TiO_2$—1.82 | 105 | None | 42 | 97 | 35 |
| Example 8: Met. Grade Fluorspar and low grade bauxite. | $CaF_2$—60 $CaCO_3$—35 $SiO_2$—5 | 325 | $Al_2O_3$—46.52 $SiO_2$—18.80 $Fe_2O_3$—8.78 $TiO_2$—1.94 | 494 | None | 238 | 97 | 197 |

All percentages and parts are by weight.

While present preferred embodiments of the invention have been described, it will be recognized that the invention may be otherwise variously embodied and practiced within the scope of the following claims.

What is claimed is:

1. Method for the concurrent production of alkali metal aluminate and hydrogen fluoride, which comprises heating a mixture of an alkaline earth metal fluoride, silica, alumina, and a source of an alkali metal monoxide, in the solid phase at a temperature above about 1000° C. in the presence of sufficient water vapor to cause hydrothermal decomposition of the fluoride, to form alkali metal aluminate, di-alkaline earth metal silicate, and hydrogen fluoride; and separating the hydrogen fluoride.

2. Method for the concurrent production of sodium aluminate and hydrogen fluoride, which comprises heating a mixture of calcium fluoride, silica, alumina, and soda ash in the solid phase at a temperature between about 1000° and about 1300° C. in the presence of sufficient water vapor to cause hydrothermal decomposition of the calcium fluoride, to form sodium aluminate, dicalcium silicate and hydrogen fluoride; and separating the hydrogen fluoride.

3. The method of claim 2 in which the heating is carried on for a period between about 15 and about 120 minutes.

4. Method for the production of sodium aluminate from aluminous ores and minerals having a high silica content, which comprises forming an intimate mixture of the ore, a calcium fluoride-containing material, and soda ash, the molar proportions of calcium fluoride, alumina, silica, and soda ash present being approximately 2:1:1:1; heating said mixture at a temperature between about 1000° and about 1300° C. for at least 15 minutes in the presence of sufficient water vapor to cause hydrothermal decomposition of the calcium fluoride, to form sodium aluminate and hydrogen fluoride; and separating the hydrogen fluoride therefrom.

5. The method of claim 4 in which the aluminous ore is a bauxite high in silica content.

6. The method of claim 4 in which the aluminous ore is an aluminous clay.

7. The method of claim 4 in which the aluminous ore is red mud waste from the Bayer process.

8. The method of claim 4 in which the aluminous ore is kaolin.

9. The method of claim 4 in which the calcium fluoride-containing material is fluorspar high in silica content.

10. The method of claim 4 in which the calcium fluoride-containing material is by-product calcium fluoride from the defluorination of phosphate rock.

References Cited in the file of this patent

UNITED STATES PATENTS

| | | |
|---|---|---|
| 678,732 | Hall | July 16, 1901 |
| 2,242,258 | Noll | May 20, 1941 |
| 2,535,036 | Broughton | Dec. 26, 1950 |
| 2,973,244 | Spence | Feb. 28, 1961 |
| 3,006,723 | Loomis | Oct. 31, 1961 |
| 3,017,246 | Kamlet | Jan. 16, 1962 |